United States Patent
Wu (10) Patent No.: US 10,171,970 B2
(45) Date of Patent: Jan. 1, 2019

(54) RESOURCE NOTIFICATION METHOD AND SYSTEM, LOCAL CSE, REMOTE CSE AND STORAGE MEDIUM

(71) Applicant: ZTE CORPORATION, Shenzhen, Guangdong Province (CN)

(72) Inventor: Hao Wu, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 103 days.

(21) Appl. No.: 15/305,353

(22) PCT Filed: Jul. 16, 2014

(86) PCT No.: PCT/CN2014/082356
§ 371 (c)(1),
(2) Date: Oct. 20, 2016

(87) PCT Pub. No.: WO2015/161571
PCT Pub. Date: Oct. 29, 2015

(65) Prior Publication Data
US 2017/0055105 A1   Feb. 23, 2017

(30) Foreign Application Priority Data
Apr. 24, 2014   (CN) .......................... 2014 1 0169865

(51) Int. Cl.
*H04W 4/70* (2018.01)
*H04W 68/00* (2009.01)

(52) U.S. Cl.
CPC .......... *H04W 4/70* (2018.02); *H04W 68/005* (2013.01)

(58) Field of Classification Search
CPC ..................................................... H04W 4/005
See application file for complete search history.

(56) References Cited

U.S. PATENT DOCUMENTS

2009/0217348 A1   8/2009   Salmela et al.

FOREIGN PATENT DOCUMENTS

| CN | 102413034 A | 4/2012 |
| CN | 103299601 A | 9/2013 |

OTHER PUBLICATIONS

XP014159436A; Architectural thoughts for M2M Systems; Nicolas Damour; Senior Manager for Business & Innovation, Sierra Wireless; Toulouse, Nov. 15, 2013.
XP055218080A; Device Management using mgmtCmd resource; InterDigital Communications; WG2/WG5; Dec. 1, 2013.
XP084003423A; CMDH Refinement; oneM2M-Arc-0397R01; Josef Blanz, Qualcomm UK, jblanz@qti.qualcomm.com; CSF definitions; ARC6.7, Oct. 3, 2013.

*Primary Examiner* — Shripal K Khajuria
(74) *Attorney, Agent, or Firm* — Ling Wu; Stephen Yang; Ling and Yang Intellectual Property (57) ABSTRACT

The present document discloses a resource attribute notification method, including: an Application Entity, AE, transmitting a first resource updating request to a local Common Service Entity, CSE; the local CSE transmitting a second resource updating request to a remote CSE when determining that a valid notification resource attribute exists in the first resource updating request; and the remote CSE creating a corresponding resource attribute according to the received second resource updating request. The present document further discloses a resource attribute notification system, a local CSE, a remote CSE and a storage medium.

11 Claims, 5 Drawing Sheets

RESOURCE NOTIFICATION METHOD AND SYSTEM, LOCAL CSE, REMOTE CSE AND STORAGE MEDIUM

TECHNICAL FIELD

The present document relates to the Machine Type Communication (MTC) terminal management field, in particular to a resource notification method and system, a local CSE, a remote CSE and a storage medium.

BACKGROUND OF THE RELATED ART

Figure 1:
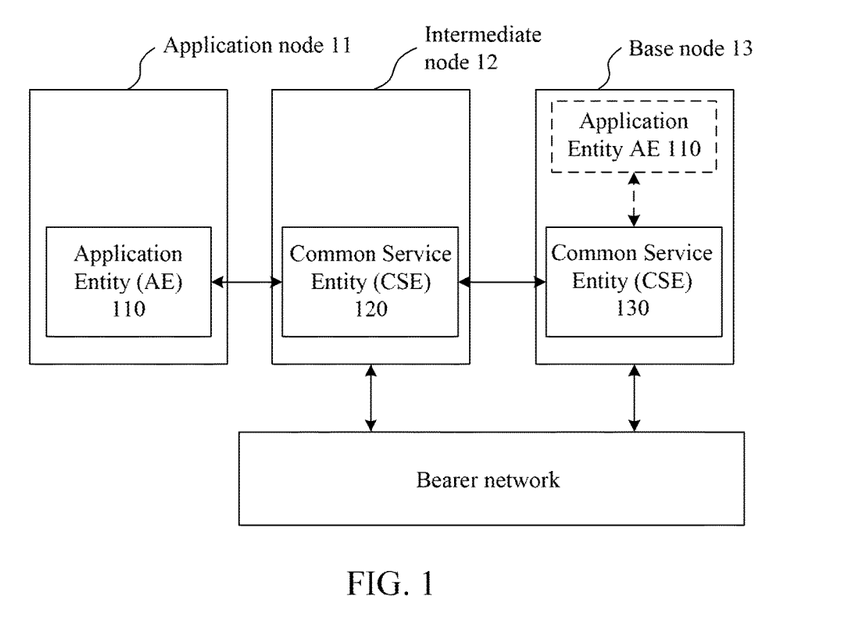
FIG. 1 illustrates a basic architecture diagram of an M2M system.

A Machine to Machine (M2M) communication network consists of a plurality of M2M nodes and a bearer network. The M2M nodes realize mutual communication through the bearer network. An M2M node at least includes an Application Entity (AE) or a Common Service Entity (CSE). The AE is a logic unit for executing actual M2M application and the CSE is a logic unit for managing and serving the application. FIG. 1 illustrates a basic architecture diagram of an M2M system. As illustrated in FIG. 1, the M2M system includes an application node 11, an intermediate node 12 and a base node 13, herein the application node 11, the intermediate node 12 and the base node 13 are M2M nodes; the application node 11 is an execution node of the terminal and includes an AE 110, and in actual application, the application node may be a smart electricity meter, a temperature sensing and control sensor, a fire alarm, a smart domestic electrical appliance or the like; the intermediate node 12 is an intermediate device which connects the execution node of the terminal to a network-side server and includes a CSE 120, and in actual application, the intermediate node may be a gateway or the like; the base node is usually the network-side server and includes a CSE 130; and the base node may further includes an AE 110, the AE here may refer to a management platform of an M2M service provider and the AE needs to be registered to the CSE on the base node.

Communication between M2M applications is realized through interaction between CSEs, the M2M applications need to be registered to CSEs, the CSEs also need to be registered to one another and thus the interaction of the M2M applications can be realized through the communication between the CSEs.

In actual application, the AE on the application node needs to be registered to the CSE on the intermediate node instead of the CSE on the base node. In the related art, if an application on the base node needs to search for an application on an application node, a query request needs to be transmitted to all intermediate nodes connected to the base node, the intermediate nodes forward the query request to each application node, and consequently not only a great amount of network resources be consumed, but also the spent time is relatively long. Therefore, in order to facilitate the operation that the AE on the intermediate node can search for an application resource on the application node, a resource notification mode is specially used, a notification resource corresponding to an original application resource on the application node is created on the intermediate node and the notification resource has the same attributes, "search tag" and "original resource address", as the original resource, and this enables the application on the intermediate node to be capable of conveniently searching for the needed application resource and accessing the original application resource according to the "original resource address". Correspondingly, an attribute "notified" is created on the original application resource and is used for indicating that the original resource is notified to which remote CSEs.

However, when the base node only needs to query a value of a specific attribute in the original application resource, if the solution of the prior art is adopted, the value of the corresponding attribute can be obtained only after the corresponding original application resource is found according to the address of the original application resource, this query method is quite complex, the query efficiency is low and the waste of the network resource is caused.

SUMMARY

In view of this, the embodiment of the present document intends to provide a resource notification method and system, a remote CSE, a remote CSE and a storage medium.

In a first aspect, the embodiment of the present document provides a resource attribute notification method. The method includes:

after receiving a first resource updating request transmitted by an Application Entity (AE) and when determining that a valid notification resource attribute exists in the first resource updating request, a local Common Service Entity (CSE) transmitting a second resource updating request to a remote CSE.

Preferably, the first resource updating request includes a notifiable attribute and an address of an original resource which needs to be updated, herein the notifiable attribute(s) include(s) an attribute list which needs to be notified.

Preferably, the local CSE determines that an attribute which satisfies the following condition in the notifiable attribute(s) is a valid notification resource attribute: an attribute included in the notifiable attribute(s) exists in the original resource which requests to be updated.

Preferably, the local CSE determines that an attribute which satisfies the following condition in the notifiable attribute(s) is a valid notification resource attribute: an attribute included in the notifiable attribute(s) exists in the original resource which requests to be updated, and is marked as optionally notifiable.

Preferably, the method further includes:
the local CSE checking whether the original resource contains a notified attribute, herein the notified attribute(s) include(s) a notified attribute list;

if the original resource contains a notified attributes, the local CSE containing a valid notification resource attribute, which is not contained in the notified attribute(s) in the notifiable attribute(s), into the second resource updating request; and if the original resource does not contain a notified attributes, the local CSE containing all valid notification resource attribute(s) in the notifiable attribute(s) into the second resource updating request.

Preferably, the second resource updating request includes a resource attribute, a value of the resource attribute and a notification resource address.

Preferably, after transmitting the second resource updating request to the remote CSE, the method further includes:

after receiving a response message transmitted by the remote CSE and containing a successfully-notified attribute, the local CSE saving the successfully-notified attribute into the notified attribute(s) of the corresponding original resource.

In a second aspect, the embodiment of the present document further provides a resource attribute notification method. The method includes:

a remote Common Service Entity (CSE) receiving a second resource updating request transmitted by a local CSE; and the remote CSE creating a corresponding resource attribute according to the received second resource updating request.

Preferably, the second resource updating request includes a resource attribute, a value of the resource attribute and a notification resource address.

Preferably, the remote CSE creating a corresponding resource attribute according to the received second resource updating request includes:

after searching for a corresponding resource according to the notification resource address in the second resource updating request, creating the corresponding resource attribute in the searched resource according to the resource attribute and the value of the resource attribute in the second resource updating request, and setting a corresponding value for the resource attribute.

Preferably, after the remote CSE creates a corresponding resource attribute according to the received second resource updating request, the method further includes:

the remote CSE returning a response message to the local CSE, herein the response message contains a successfully-notified attribute.

In a third aspect, the embodiment of the present document further provides a local Common Service Entity (CSE). The local CSE includes a first resource updating request receiving module, a determination module and a second resource updating request transmitting module, herein:

the first resource updating request receiving module is configured to receive a first resource updating request transmitted by an Application Entity (AE);

the determination module is configured to determine whether a valid notification resource attribute exists in the first resource updating request; and the second resource updating request transmitting module is configured to, when a valid notification resource attribute exists in the first resource updating request, transmit a second resource updating request to a remote CSE.

Preferably, the first resource updating request includes a notifiable attribute and an address of an original resource which needs to be updated, herein the notifiable attribute(s) include(s) an attribute list which needs to be notified.

Preferably, the determination module is configured to determine that an attribute which satisfies the following condition in the notifiable attribute(s) is a valid notification resource attribute: an attribute included in the notifiable attribute(s) exists in the original resource which requests to be updated.

Preferably, the determination module is configured to determine that an attribute which satisfies the following condition in the notifiable attribute(s) is a valid notification resource attribute: an attribute included in the notifiable attribute(s) exists in the original resource which requests to be updated, and is marked as optionally notifiable.

Preferably, the second resource updating request transmitting module is configured to check whether the original resource contains a notified attribute, herein the notified attribute(s) include(s) a notified attribute list;

if the original resource contains a notified attributes, contain a valid notification resource attribute, which is not contained in the notified attribute(s) in the notifiable attribute(s), into the second resource updating request; and if the original resource does not contain a notified attributes, contain all valid notification resource attribute(s) in the notifiable attribute(s) into the second resource updating request.

In a fourth aspect, the embodiment of the present document further provides a remote Common Service Entity (CSE). The remote CSE includes a second resource updating request receiving module and an attribute creation module, herein:

the second resource updating request receiving module is configured to receive a second resource updating request transmitted by a local CSE; and the attribute creation module is configured to create a corresponding resource attribute according to the received second resource updating request.

Preferably, the second resource updating request includes a resource attribute, a value of the resource attribute and a notification resource address.

Preferably, the attribute creation module is configured to, after searching for a corresponding resource according to the notification resource address in the second resource updating request, create the corresponding resource attribute in the searched resource according to the resource attribute and the value of the resource attribute in the second resource updating request, and set a corresponding value for the resource attribute.

Preferably, the remote CSE further includes a response module configured to, after the attribute creation module creates a corresponding resource attribute according to the received second resource updating request, return a response message to the local CSE, herein the response message contains a successfully-notified attribute.

In a fifth aspect, the embodiment of the present document further provides a resource attribute notification system. The system includes an Application Entity (AE), a local (Common Service Entity) CSE and a remote CSE, herein:

the AE is configured to transmit a first resource updating request to the local CSE;

the local CSE is configured to, when determining that a valid notification resource attribute exists in the first resource updating request, transmit a second resource updating request to the remote CSE; and the remote CSE is configured to create a corresponding resource attribute according to the received second resource updating request.

In a sixth aspect, the embodiment of the present document provides a readable storage medium, in which executable instructions are stored, herein the executable instructions are used for executing the resource attribute notification method provided by the embodiment in the first aspect;

and/or the executable instructions are used for executing the resource attribute notification method provided by the embodiment in the second aspect.

According to the resource notification method and system, the local CSE, the remote CSE and the storage medium provided by the embodiments of the present document, the AE transmits a first resource updating request to the local CSE; when determining that a valid notification resource attribute exists in the first resource updating request, the local CSE transmits a second resource updating request to the remote CSE; and the remote CSE creates a corresponding resource attribute according to the received second resource updating request. Thereby, an attribute of the resource can be notified to the remote CSE, such that when a query party only needs to query an attribute value of the resource, the query party does not necessarily access the original resource to obtain the needed information, the query complexity of the query party is reduced, the unnecessary query signaling is reduced, the network resource is saved and the query speed is improved.

BRIEF DESCRIPTION OF DRAWINGS

FIG. 9-1 illustrates a basic structural diagram 1 of a local CSE provided by the embodiment of the present document;

FIG. 9-2 illustrates a basic structural diagram 2 of a local CSE provided by the embodiment of the present document;

FIG. 10-1 illustrates a basic structural diagram 1 of a remote CSE provided by the embodiment of the present document;

FIG. 10-2 illustrates a basic structural diagram 2 of a remote CSE provided by the embodiment of the present document.

SPECIFIC EMBODIMENTS

In the embodiments of the present document, an AE transmits a first resource updating request to a local CSE; when determining that a valid notification resource attribute exists in the first resource updating request, the local CSE transmits a second resource updating request to a remote CSE; and the remote CSE creates a corresponding resource attribute according to the received second resource updating request.

The present document will be further described below in detail through specific embodiments with reference to the drawings.

Embodiment 1

Figure 2:
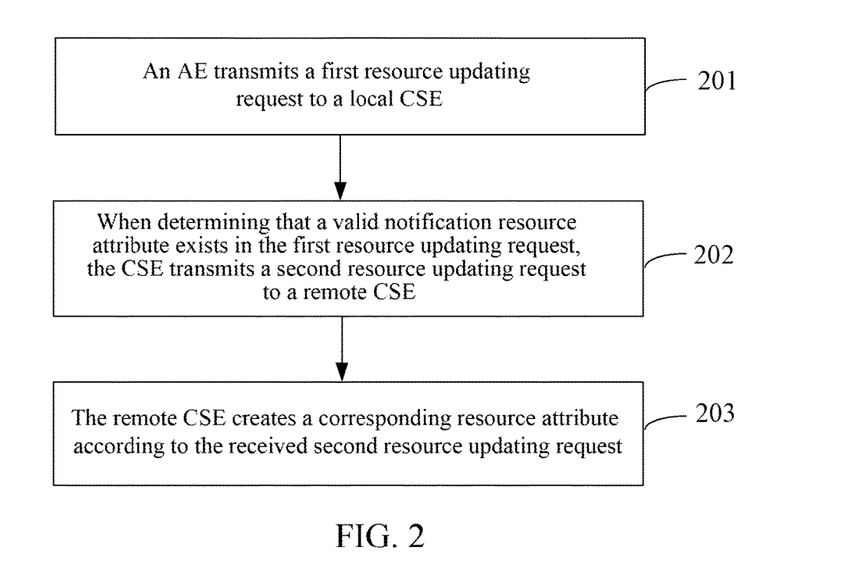
FIG. 2 illustrates a flowchart 1 of a resource attribute notification method provided by the embodiment of the present document.

This embodiment of the present document provides a resource attribute notification method. As illustrated in FIG. 2, the method includes the following steps:

In step 201: an AE transmits a first resource updating request to a local CSE.

Here, the local CSE refers to a CSE to which the AE is registered, correspondingly all other CSEs (i.e., CSEs to which the AE is not registered) except the local CSE in an M2M system are called as remote CSEs, and thus the remote CSEs include a CSE on an intermediate node and a CSE on a base node which have no registration relation with the AE.

In this step, the first resource updating request transmitted by the AE to the local CSE includes a notifiable attribute and an address of an original resource which needs to be updated, herein the notifiable attribute(s) include(s) an attribute list which needs to be notified.

Specifically, the notifiable attribute(s) include(s) an attribute list which needs to be notified, and an attribute which may be included includes "application name", "application version", "application identifier", etc.; and it needs to be stated that examples of some common attributes are only given here and are not used for limiting the range of the notifiable attributes, and in actual application, any one or more attributes of a corresponding resource may be notified.

The address of the original resource which needs to be updated includes an original address of a resource which is expected to be notified by the AE and corresponds to the notifiable attribute, i.e., a local address of the corresponding resource. For example, a specific address of an original resource which needs to be updated may be LocalCSEroot/AE1.

In step 202, when determining that a valid notification resource attribute exists in the first resource updating request, the CSE transmits a second resource updating request to a remote CSE.

The second resource updating request includes a resource attribute, a value of the resource attribute and a notification resource address.

In one implementation mode, the local CSE determines that an attribute which satisfies the following condition in the notifiable attribute(s) is a valid notification resource attribute: an attribute included in the notifiable attribute(s) exists in the original resource which requests to be updated.

In another implementation mode, the local CSE determines that an attribute which satisfies the following condition in the notifiable attribute(s) is a valid notification resource attribute: an attribute included in the notifiable attribute(s) exists in the original resource which requests to be updated, and is marked as optionally notifiable.

Aiming at the two implementation modes, further, the local CSE checks whether the original resource contains a notified attribute, herein the notified attribute(s) include(s) a notified attribute list;

if the original resource contains a notified attribute, the local CSE contains the valid notification resource attribute, which is not contained in the notified attribute(s) in the notifiable attribute(s), into the second resource updating request; and if the original resource does not contain a notified attribute, the local CSE contains all valid notification resource attribute(s) in the notifiable attribute(s) into the second resource updating request.

In step 203, the remote CSE creates a corresponding resource attribute according to the received second resource updating request.

Specifically, after receiving the second resource updating request and searching for the corresponding resource according to the notification resource address in the second resource updating request, the remote CSE creates the corresponding resource attribute in the searched resource according to the resource attribute and the value of the resource attribute in the second resource updating request, and sets a corresponding value for the resource attribute.

Further, after the remote CSE creates the corresponding resource attribute according to the received second resource updating request, the method provided by the embodiment of the present document further includes: the remote CSE returning a response message to the local CSE, herein the response message contains a successfully-notified attribute, i.e., an attribute which is successfully created by the remote CSE on the corresponding resource; and after receiving the response message transmitted by the remote CSE, the local CSE saving the successfully-notified attribute into the notified attribute(s) of the corresponding original resource.

Figure 3:
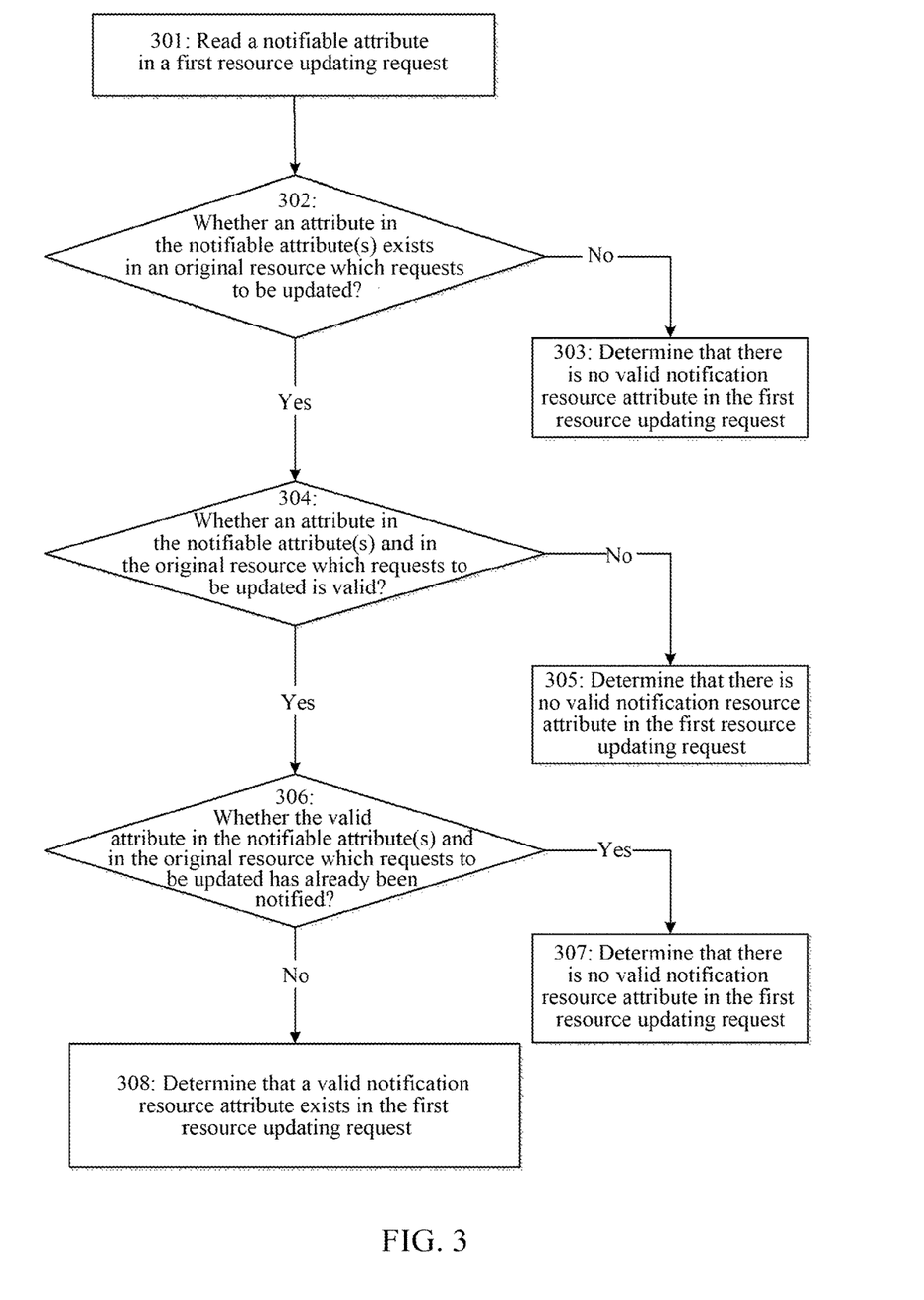
FIG. 3 illustrates a flowchart of a method provided by the embodiment of the present document for a local CSE to determine whether a valid notification resource attribute exists in a first resource updating request.

The present document provides an embodiment of a method for a local CSE to determine whether a valid notification resource attribute exists in a first resource updating request. Referring to FIG. 3, the method mainly includes the following steps:

In step 301, a notifiable attribute in a first resource updating request is read.

In step 302, whether an attribute in the notifiable attribute(s) exists in an original resource which requests to be updated is judged. If an attribute in the notifiable attribute(s) exists in the original resource, the process is turned to step 303; and if there is no attribute in the notifiable attribute(s) in the original resource, the process is turned to step 304.

In step 303, that there is no valid notification resource attribute in the first resource updating request is determined. At this moment, error information may be returned to the AE to indicate that there is no valid notification attribute.

In step 304, whether an attribute in the notifiable attribute(s) and in the original resource which requests to be updated is valid is judged. In order to facilitate description, the attribute(s) in the notifiable attribute(s) and in the original resource which requests to be updated is/are referred as a first attribute set in the following.

Specifically, whether an attribute in the first attribute set is valid may be determined by detecting an attribute tag of the attribute in the first attribute set. Usually, when an attribute tag of one attribute is "notifiable attribute" or "attribute which must be notified", the attribute is a valid attribute; and when an attribute tag of one attribute is "non-notifiable attribute", the attribute is an invalid attribute.

In this step, if a judgment result is no, it indicates that the attributes in the first attribute set are all invalid, and at this moment, the process is turned to step 305; and if the judgment result is yes, it indicates that the first attribute set has at least one attribute which is valid, and at this moment the process is turned to step 306 for continuous execution.

In step 305, that there is no valid notification resource attribute in the first resource updating request is determined. At this moment, error information may be returned to the AE to indicate that there is no valid notification attribute.

In step 306, whether the valid attribute in the notifiable attribute(s) and in the original resource which requests to be updated has already been notified is judged.

In order to facilitate description, the valid attribute(s) in the notifiable attribute(s) and in the original resource which requests to be updated are hereunder referred as a second attribute set.

Specifically, firstly the local CSE may detect whether the original resource contains a notified attribute, herein the notified attribute(s) include(s) a notified attribute list; if the original resource does not contain any notified attribute, it indicates that the attribute(s) in the second attribute set has/have not been notified; and if the original resource contains a notified attribute, the attribute in the second attribute set may be compared with the attribute in the notified attribute(s) to determine whether the attribute in the second attribute set has already been notified. Specifically, when an attribute in the second attribute set exists in the notified attribute(s), it indicates that the attribute in the second attribute set has already been notified; and when an attribute in the second attribute set does not exist in the notified attribute(s) of the original resource, it indicates that the attribute in the second attribute set has not been notified.

Therefore, in step 306, when that the attributes in the second attribute set have already been all notified is judged, the process is turned to step 307; and otherwise, the process is turned to step 308.

In step 307, that there is no valid notification resource attribute in the first resource updating request is determined. At this moment, error information may be returned to the AE to indicate that the notifiable attributes have already been all notified.

In step 308, that a valid notification resource attribute exists is determined. At this moment, a second resource updating request may be transmitted to the remote CSE according to an attribute which has not been notified in the second attribute set.

The second resource updating request, which is transmitted by the local CSE to the remote CSE when determining that a valid notification resource attribute exists in the first resource updating request, includes a resource attribute, a value of the resource attribute and a notification resource address.

The resource attribute refer to an attribute which is included in "notifiable attribute(s)" in the first resource updating request transmitted by the AE and is determined as a valid notification resource attribute by the local CSE; and the notification resource address refers to an address of a resource with the notification resource attribute which needs to be notified on the remote CSE, and this address is an address that an original resource which requests to be updated by the AE has already been notified to the remote CSE, and may be obtained in "notified" attribute(s) of a current corresponding resource.

Embodiment 2

Figure 4:
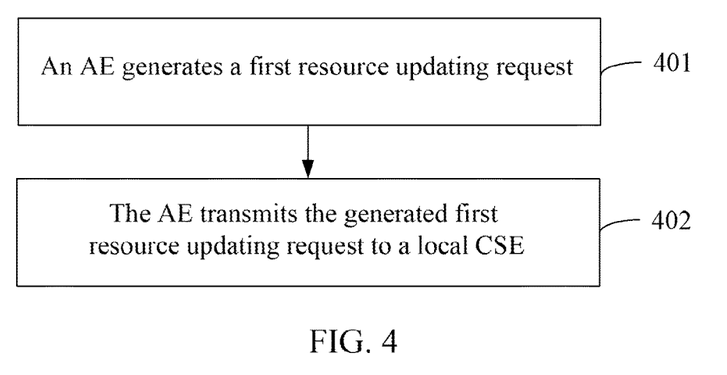
FIG. 4 illustrates a flowchart 2 of a resource attribute notification method provided by the embodiment of the present document.

This embodiment of the present document provides another resource attribute notification method. As illustrated in FIG. 4, the method includes:

In step 401, an AE generates a first resource updating request, herein the first resource updating request includes a notifiable attribute and an address of an original resource which needs to be updated, herein the notifiable attribute(s) include(s) an attribute list which needs to be notified.

In step 402, the AE transmits the generated first resource updating request to a local CSE.

Specifically, the notifiable attribute(s) include(s) an attribute list which needs to be notified, and an attribute which may be included includes "application name", "application version", "application identifier", etc.; and it needs to be stated that examples of some common attributes are only given here and are not used for limiting the range of the notifiable attributes, and in actual application, any one or more attributes of a corresponding resource may be notified.

The address of the original resource which needs to be updated includes an original address of a resource which is expected to be notified by the AE and corresponds to the notifiable attribute, i.e., a local address of the corresponding resource. For example, a specific address of an original resource which needs to be updated may be LocalCSEroot/AE1.

Embodiment 3

Figure 5:
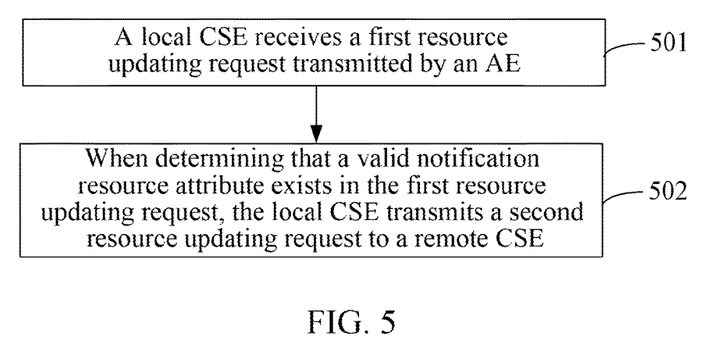
FIG. 5 illustrates a flowchart 3 of a resource attribute notification method provided by the embodiment of the present document.

This embodiment of the present document further provides another resource attribute notification method. As illustrated in FIG. 5, the method includes the following steps:

In step 501, a local CSE receives a first resource updating request transmitted by an AE.

In step 502, when determining that a valid notification resource attribute exists in the first resource updating request, the local CSE transmits a second resource updating request to a remote CSE.

Therein, for a process that the CSE determines whether a valid notification resource attribute exists in the first resource updating request, it may refer to the embodiment illustrated in FIG. 3 and thus it is not repetitively described here.

The second resource updating request, which is transmitted by the local CSE to the remote CSE when determining that a valid notification resource attribute exists in the first resource updating request, includes a resource attribute, a value of the resource attribute and a notification resource address.

The resource attribute refers to an attribute which is included in "notifiable attribute(s)" in the first resource updating request transmitted by the AE and is determined as a valid notification resource attribute by the local CSE; and the notification resource address refers to an address of a resource, with the notification resource attribute which needs to be notified, on the remote CSE, and this address is an address that an original resource which requests to be updated by the AE has already been notified to the remote CSE, and may be obtained in "notified" attribute(s) of a current corresponding resource.

Further, if the local CSE receives a response message transmitted by the remote CSE and containing a successfully-notified attribute, the local CSE saves the successfully-notified attribute into the notified attribute(s) of the corresponding original resource.

Embodiment 4

Figure 6:
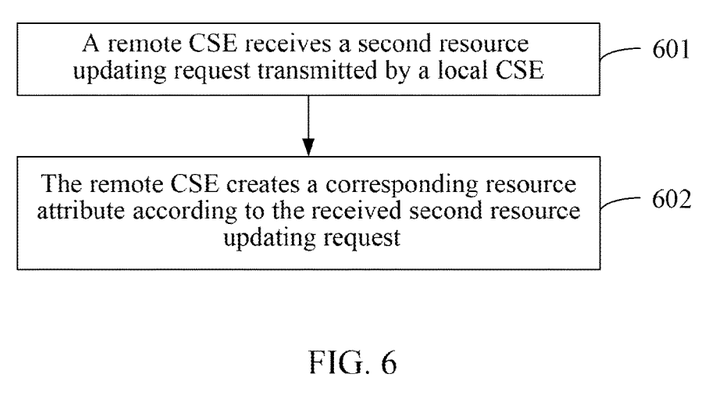
FIG. 6 illustrates a flowchart 4 of a resource attribute notification method provided by the embodiment of the present document.

The embodiment of the present document provides another resource attribute notification method. As illustrated in FIG. 6, the method includes:

In step 601, a remote CSE receives a second resource updating request transmitted by a local CSE, herein the second resource updating request includes a resource attribute, a value of the resource attribute and a notification resource address.

In step 602, the remote CSE creates a corresponding resource attribute according to the received second resource updating request.

Specifically, after receiving the second resource updating request and searching for the corresponding resource according to the notification resource address in the second resource updating request, the remote CSE creates a corresponding resource attribute in the searched resource according to the resource attribute and the value of the resource attribute in the second resource updating request, and sets a corresponding value for the resource attribute.

Further, after the remote CSE creates a corresponding resource attribute according to the received second resource updating request, the method provided by the embodiment of the present document further includes: the remote CSE returning a response message to the local CSE, herein the response message contains a successfully-notified attribute.

Embodiment 5

Figure 7:
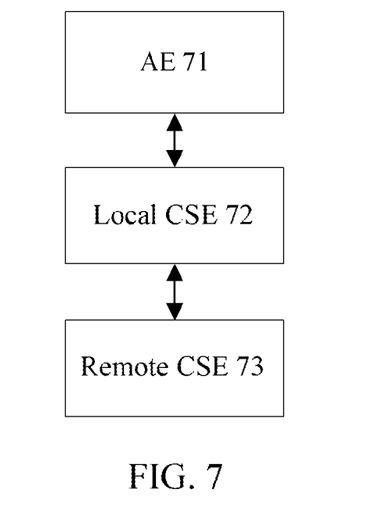
FIG. 7 illustrates a basic structural diagram of a resource attribute notification system provided by the embodiment of the present document.

This embodiment of the present document provides a resource attribute notification system. As illustrated in FIG. 7, the system includes an AE 71, a local CSE 72 and a remote CSE 73, herein, the AE 71 is configured to transmit a first resource updating request to the local CSE 72;

the local CSE 72 is configured to, when determining that a valid notification resource attribute exists in the first resource updating request, transmit a second resource updating request to the remote CSE 73; and the remote CSE 73 is configured to create a corresponding resource attribute according to the received second resource updating request.

The first resource updating request includes a notifiable attribute and an address of an original resource which needs to be updated, herein the notifiable attribute(s) include(s) an attribute list which needs to be notified.

Specifically, the notifiable attribute(s) include(s) an attribute list which needs to be notified, and an attribute which may be included includes "application name", "application version", "application identifier", etc.; and it needs to be stated that examples of some common attributes are only given here and are not used for limiting the range of the notifiable attributes, and in actual application, any one or more attributes of a corresponding resource may be notified.

The address of the original resource which needs to be updated includes an original address of a resource which is expected to be notified by the AE and corresponds to the notifiable attribute, i.e., a local address of the corresponding resource. For example, a specific address of an original resource which needs to be updated may be LocalCSEroot/AE1.

Preferably, the local CSE 72 is configured to determine that an attribute which satisfies the following condition in the notifiable attribute(s) is a valid notification resource attribute: an attribute included in the notifiable attribute(s) exists in the original resource which requests to be updated.

Preferably, the local CSE 72 is configured to determine that an attribute which satisfies the following condition in the notifiable attribute(s) is valid notification resource attribute: an attribute included in the notifiable attribute(s) exists in the original resource which requests to be updated, and is marked as optionally notifiable.

Further, the local CSE 72 is configured to check whether the original resource contains a notified attribute, herein the notified attribute(s) include(s) a notified attribute list;

if the original resource contains a notified attribute, the local CSE 72 contains the valid notification resource attribute, which is not contained in the notified attribute(s) in the notifiable attribute(s), into the second resource updating request; and if the original resource does not contain a notified attribute, the local CSE 72 contains all valid notification resource attribute(s) in the notifiable attribute(s) in the second resource updating request.

Preferably, the second resource updating request, which is transmitted by the local CSE 72 to the remote CSE 73 when determining that a valid notification resource attribute exists in the first resource updating request, includes a resource attribute, a value of the resource attribute and a notification resource address.

The resource attribute refer to an attribute which is included in "notifiable attribute(s)" in the first resource updating request transmitted by the AE 71 and is determined as a valid notification resource attribute by the local CSE 72; and the notification resource address refers to an address of a resource, with the notification resource attribute which needs to be notified, on the remote CSE 73, and this address is an address that an original resource which requests to be updated by the AE has already been notified to the remote CSE 73, and may be obtained in "notified" attribute(s) of a current corresponding resource.

Preferably, the remote CSE 73 is configured to, after receiving the second resource updating request and searching for the corresponding resource according to the notification resource address in the second resource updating request, create a corresponding resource attribute in the searched resource according to the resource attribute and the value of the resource attribute in the second resource updating request, and set a corresponding value for the resource attribute.

Preferably, the remote CSE 73 is configured to, after creating a corresponding resource attribute according to the received second resource updating request, return a response message to the local CSE 72, herein the response message contains a successfully-notified attribute, i.e., an attribute which is successfully created by the remote CSE 73 on the corresponding resource; and after receiving the response message transmitted by the remote CSE 73, the local CSE 72 saves the successfully-notified attribute in the notified attribute of the corresponding original resource.

Embodiment 6

Figure 8:
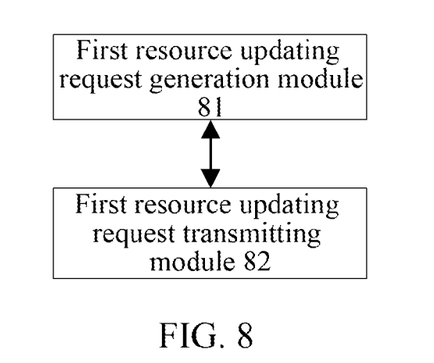
FIG. 8 illustrates a basic structural diagram of an AE provided by the embodiment of the present document.

This embodiment of the present document provides an AE. As illustrated in FIG. 8, the AE includes a first resource updating request generation module 81 and a first resource updating request transmitting module 82, herein, The first resource updating request generation module 81 is configured to generate a first resource updating request; and The first resource updating request transmitting module 82 is configured to transmit the generated first resource updating request to a local CSE.

In a specific implementation process, the first resource updating request generation module 81 and the first resource updating request transmitting module 82 may be implemented by communication function chips inside the AE.

Embodiment 7

Figure 91:
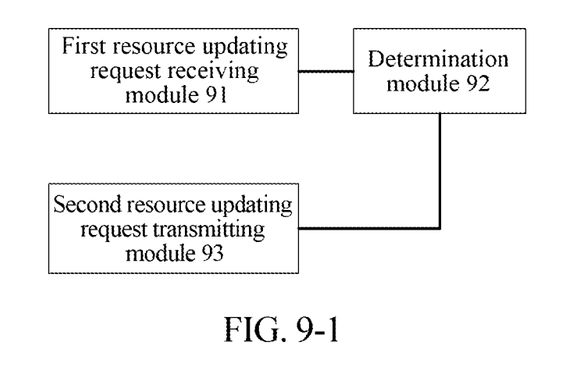

This embodiment of the present document provides a local Common Service Entity (CSE). As illustrated in FIG. 9-1, the local CSE includes a first resource updating request receiving module 91, a determination module 92 and a second resource updating request transmitting module 93, herein, the first resource updating request receiving module 91 is configured to receive a first resource updating request transmitted by an AE;

the determination module 92 is configured to determine whether a valid notification resource attribute exists in the first resource updating request; and the second resource updating request transmitting module 93 is configured to, when a valid notification resource attribute exists in the first resource updating request, transmit a second resource updating request to a remote CSE.

Preferably, the first resource updating request includes a notifiable attribute and an address of an original resource which needs to be updated, herein the notifiable attribute(s) include(s) an attribute list which needs to be notified.

Preferably, the determination module 92 is configured to determine that an attribute which satisfies the following condition in the notifiable attribute(s) is a valid notification resource attribute: an attribute included in the notifiable attribute(s) exists in the original resource which requests to be updated.

Preferably, the determination module 92 is configured to determine that an attribute which satisfies the following condition in the notifiable attribute(s) is a valid notification resource attribute: an attribute included in the notifiable attribute(s) exists in the original resource which requests to be updated, and is marked as optionally notifiable.

Preferably, the second resource updating request transmitting module is configured to check whether the original resource contains a notified attribute, herein the notified attribute(s) include(s) a notified attribute list;

if the original resource contains a notified attribute, contain the valid notification resource attribute, which is not contained in the notified attribute(s), in the notifiable attribute(s), into the second resource updating request; and if the original resource does not contain a notified attribute, contain all valid notification resource attribute(s) in the notifiable attribute(s) into the second resource updating request.

Preferably, the second resource updating request includes a resource attribute, a value of the resource attribute and a notification resource address.

Figure 92:
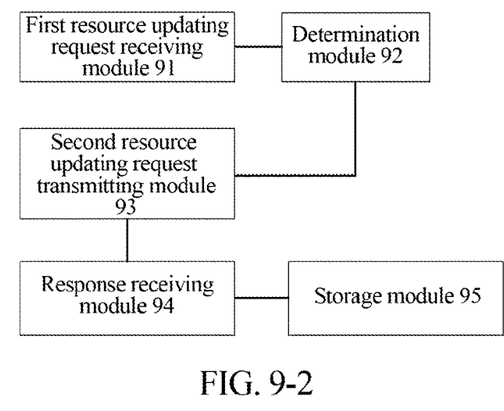

As illustrated in FIG. 9-2, the local CSE further includes a response receiving module 94 and a storage module 95, herein:

the response receiving module 94 is configured to receive a response message transmitted by the remote CSE and containing a successfully-notified attribute; and the storage module 95 is configured to save the successfully-notified attribute contained in the response message into the notified attribute(s) of the corresponding original resource.

In a specific implementation process, the first resource updating request receiving module 91, the second resource updating request transmitting module 93 and the response receiving module 94 may be implemented by communication function chips inside the local CSE; the determination module 92 may be implemented by a Central Processing Unit (CPU), a Micro Processing Unit (MPU), a Digital Signal Processor (DSP) or a Field Programmable Gate Array (FPGA) in the local CSE; and the storage module 95 may be implemented by a storage chip in the local CSE.

Embodiment 8

Figure 101:
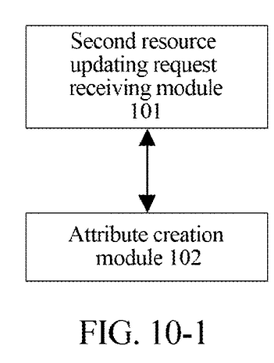

This embodiment of the present document provides a local Common Service Entity (CSE). As illustrated in FIG. 10-1, the remote CSE includes a second resource updating request receiving module 101 and an attribute creation module 102, herein, the second resource updating request receiving module 101 is configured to receive a second resource updating request transmitted by a local CSE; and the attribute creation module 102 is configured to create a corresponding resource attribute according to the received second resource updating request.

The second resource updating request includes a resource attribute, a value of the resource attribute and a notification resource address.

Preferably, the attribute creation module 102 is configured to, after searching for a corresponding resource according to the notification resource address in the second resource updating request, create the corresponding resource attribute in the searched resource according to the resource attribute and the value of the resource attribute in the second resource updating request, and set a corresponding value for the resource attribute.

Figure 102:
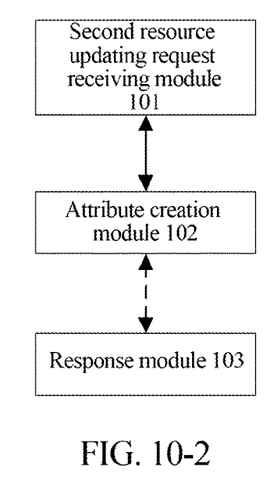

Preferably, as illustrated in FIG. 10-2, the remote CSE further includes a response module 103 configured to, after the attribute creation module 102 creates a corresponding resource attribute according to the received second resource updating request, return a response message to the local CSE, herein the response message contains a successfully-notified attribute.

In a specific implementation process, the second resource updating request receiving module 101 and the response module 103 may be implemented by communication function chips inside the remote CSE; and the attribute creation module 102 may be implemented by a CPU, an MPU, a DSP or an FPGA in the remote CSE.

One skilled in the art shall understand that the embodiments of the present document may be provided in the form of methods, systems or computer program products. Therefore, the present document may adopt the form of full hardware embodiments, full software embodiments or combined software and hardware embodiments. In addition, the present document may adopt the form of computer program products implemented based on one or more of computer usable memory media (including but not limited to disk memories, optical memories, etc.) containing computer usable program codes therein.

The present document is described by referring to flowcharts and/or block diagrams of the method, the apparatus (system) and the computer program products according to the embodiments of the present document. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded computers or other programmable data processing devices to produce a machine, such that instructions executed through processors of computers or other programmable data processing devices produce apparatuses for implementing functions designated in one process or more processes of the flowcharts and/or one block or more blocks of the block diagrams.

These computer program instructions may also be stored in computer-readable memories which can instruct computers or other programmable data processing devices to work in a specific manner, such that the instructions stored in the computer-readable memories produce products including instruction devices, and the instruction devices realize functions designated in one process or more processes in the flowcharts and/or one block or more blocks in the block diagrams.

These computer program instructions may also be loaded to computers or other programmable data processing devices, such that a series of operation steps are executed on the computers or other programmable devices to perform processing realized by the computers, such that the instructions which are executed on the computers or other programmable devices provide steps for realizing functions designated in one process or more processes in the flowcharts and/or one block or more blocks in the block diagrams.

In the embodiments of the present document, if software function modules are used as a form of implementing the above mentioned resource attribute notification methods and are sold or used as independent products, the methods may also be stored in a computer-readable storage medium. Based on such understanding, the technical solution of the embodiments of the present document substantially or the portion which makes a contribution to the prior art may be reflected by means of software product, the computer software product is stored in a storage medium and includes a plurality of instructions which enable a computer device (which may be a personal computer, a server or a network device) to execute all or partial steps of the method provided by each embodiment of the present document. The foresaid storage medium includes various mediums capable of storing program codes, such as a USB flash disk, a mobile hard disk, a Read-Only Memory (ROM), a magnetic disk or a compact disk. Therefore, the embodiments of the present document are not limited to any specific combinations of hardware and software.

Correspondingly, the embodiment of the present document further provides a readable storage medium, the readable storage medium storing executable instructions, herein the executable instructions are used for executing the resource attribute notification method provided by embodiment 3;

and/or the executable instructions are used for executing the resource attribute notification method provided by embodiment 4.

What are described above are just preferred embodiments of the present document and are not used for limiting the protection scope of the present document. Other various embodiments may be obtained according to the contents of the present document. One skilled in the art may make various corresponding variations and transformations according to the present document without departing from the rule and essence of the present document. Any modification, equivalent replacement, improvement and the like made within the spirit and principle of the present document shall be also included in the protection scope of the present document.

INDUSTRIAL APPLICABILITY

In the embodiments of the present document, the AE transmits a first resource updating request to the local CSE; when determining that a valid notification resource attribute exists in the first resource updating request, the local CSE transmits a second resource updating request to the remote CSE; and the remote CSE creates a corresponding resource attribute according to the received second resource updating request. Thereby, the attribute(s) of the resource can be notified to the remote CSE, such that when a query party only needs to query an attribute value of the resource, the query party does not necessarily access the original resource to obtain the needed information, the query complexity of the query party is reduced, the unnecessary query signaling is reduced, the network resource is saved and the query speed is improved.

What is claimed is:

1. A resource attribute notification method, comprising:
after receiving a first resource updating request transmitted by an Application Entity, AE, and when determining that a valid notification resource attribute exists in the first resource updating request, a local Common Service Entity, CSE, transmitting a second resource updating request to a remote CSE; wherein the first resource updating request includes a notifiable attribute and an address of an original resource which needs to be updated,
wherein the notifiable attribute includes an attribute list which needs to be notified;
wherein the local CSE determines that an attribute which satisfies the following condition in the notifiable attribute is a valid notification resource attribute: an attribute included in the notifiable attribute exists in the original resource which requests to be updated,
or,
wherein the local CSE determines that an attribute which satisfies the following condition in the notifiable attribute is a valid notification resource attribute: an attribute included in the notifiable attribute exists in the original resource which requests to be updated, and is marked as optionally notifiable;

wherein the method further comprises:
the local CSE checking whether the original resource contains a notified attribute, wherein the notified attribute includes a notified attribute list
if the original resource contains a notified attribute, the local CSE containing a valid notification resource attribute, which is not contained in the notified attribute in the notifiable attribute, into the second resource updating request and
if the original resource does not contain a notified attribute, the local CSE containing all valid notification resource attributes in the notifiable attribute into the second resource updating request.

2. The method according to claim 1, wherein the second resource updating request includes a resource attribute, a value of the resource attribute and a notification resource address.

3. The method according to claim 1, wherein, after transmitting the second resource updating request to the remote CSE, the method further comprises:
After receiving a response message transmitted by the remote CSE and containing a successfully-notified attribute, the local CSE saving the successfully-notified attribute into the notified attribute of the corresponding original resource.

4. A non-transitory readable storage medium, in which executable instructions are stored, wherein the executable instructions are used for executing the resource attribute notification method according to claim 1;
and/or
the executable instructions are used for executing a resource attribute notification method, comprising:
a remote Common Service Entity, CSE, receiving a second resource updating request transmitted by a local CSE; and
the remote CSE creating a corresponding resource attribute according to the received second resource updating request.

5. A resource attribute notification method, comprising:
A remote Common Service Entity, CSE, receiving a second resource updating request transmitted by a local CSE; and
the remote CSE creating a corresponding resource attribute according to the received second resource updating request; wherein the second resource updating request includes a resource attribute, a value of the resource attribute and a notification resource address;
wherein the remote CSE creating a corresponding resource attribute according to the received second resource updating request comprises:
after searching for a corresponding resource according to the notification resource address in the second resource updating request, creating the corresponding resource attribute in the searched resource according to the resource attribute and the value of the resource attribute in the second resource updating request, and setting a corresponding value for the resource attribute.

6. The method according to claim 5, wherein, after the remote CSE creates a corresponding resource attribute according to the received second resource updating request, the method further comprises:
the remote CSE returning a response message to the local CSE, wherein the response message contains a successfully-notified attribute.

7. A local Common Service Entity, CSE, comprising hardware performing instructions stored in a non-transitory computer readable medium which executes steps in following modules: a first resource updating request receiving module, a determination module and a second resource updating request transmitting module, wherein:
the first resource updating request receiving module is configured to receive a first resource updating request transmitted by an Application Entity, AE;
the determination module is configured to determine whether a valid notification resource attribute exists in the first resource updating request; and
the second resource updating request transmitting module is configured to, when a valid notification resource attribute exists in the first resource updating request, transmit a second resource updating request to a remote CSE; wherein the first resource updating request includes a notifiable attribute and an address of an original resource which needs to be updated,
wherein the notifiable attribute includes an attribute list which needs to be notified;
wherein the determination module is configured to determine that an attribute which satisfies the following condition in the notifiable attribute is a valid notification resource attribute: an attribute included in the notifiable attribute exists in the original resource which requests to be updated,
or,
wherein the determination module is configured to determine that an attribute which satisfies the following condition in the notifiable attribute is a valid notification resource attribute: an attribute included in the notifiable attribute exists in the original resource which requests to be updated, and is marked as optionally notifiable;
wherein the second resource updating request transmitting module is configured to check whether the original resource contains a notified attribute, wherein the notified attribute includes a notified attribute list;
if the original resource contains a notified attribute, contain a valid notification resource attribute, which is not contained in the notified attribute in the notifiable attribute, into the second resource updating request and
if the original resource does not contain a notified attribute, contain all valid notification resource attributes in the notifiable attribute into the second resource updating request.

8. The local CSE according to claim 7, wherein the second resource updating request includes a resource attribute, a value of the resource attribute and a notification resource address.

9. The local CSE according to claim 7, wherein the local CSE further comprises hardware performing instructions stored in a non-transitory computer readable medium which executes steps in following modules: a response receiving module and a storage module, wherein:
the response receiving module is configured to receive a response message transmitted by the remote CSE and containing a successfully-notified attribute; and
the storage module is configured to save the successfully-notified attribute contained in the response message into the notified attribute of the corresponding original resource.

10. A remote Common Service Entity, CSE, comprising hardware performing instructions stored in a non-transitory computer readable medium which executes steps in following modules: a second resource updating request receiving module and an attribute creation module, wherein:

the second resource updating request receiving module is configured to receive a second resource updating request transmitted by a local CSE; and the attribute creation module is configured to create a corresponding resource attribute according to the received second resource updating request; wherein the second resource updating request includes a resource attribute, a value of the resource attribute and a notification resource address, and, wherein the attribute creation module is configured to, after searching for a corresponding resource according to the notification resource address in the second resource updating request, create the corresponding resource attribute in the searched resource according to the resource attribute and the value of the resource attribute in the second resource updating request, and set a corresponding value for the resource attribute.

11. The remote CSE according to claim 10, wherein the remote CSE further comprises hardware performing instructions stored in a non-transitory computer readable medium which executes steps in following module: a response module, configured to, after the attribute creation module creates a corresponding resource attribute according to the received second resource updating request, return a response message to the local CSE, wherein the response message contains a successfully-notified attribute.

* * * * *